United States Patent

[11] 3,601,633

[72] Inventor Lawson C. Nichols
Midland Park, N.J.
[21] Appl. No. 833,992
[22] Filed June 17, 1969
[45] Patented Aug. 24, 1971
[73] Assignee The Bendix Corporation

[54] PRECISION MULTIPLIER AND DC TO AC CONVERTER
7 Claims, 1 Drawing Fig.

[52] U.S. Cl. .......... 307/229, 328/160
[51] Int. Cl. .......... G06g 7/16
[50] Field of Search .......... 307/229; 328/160

[56] References Cited

UNITED STATES PATENTS 3,117,242 1/1964 Slack .......... 307/229
3,293,424 12/1966 Fisher .......... 307/229
3,473,043 10/1969 James .......... 307/330
3,475,601 10/1969 Port .......... 307/229

*Primary Examiner*—Donald D. Forrer
*Assistant Examiner*—Harold A. Dixon
*Attorneys*—S. H. Hartz and Plante, Arens, Hartz, Hix and Smith

ABSTRACT: A multiplier circuit having a fixed resistor and a variable resistance such as a field effect transistor, controlled by a variable DC input signal, forming an attenuator having an attenuation factor determined by the DC input signal. A fixed DC signal is applied to the attenuator and the attenuator provides a DC output signal which is fed-back and added to the variable DC input signal so that the attenuation factor is substantially independent of the characteristics of the variable resistance and is determined by the DC input signal. A variable AC input signal also is applied to the attenuator which provides an AC signal at its output corresponding to the product of the AC and DC input signals.

PATENTED AUG 24 1971 3,601,633
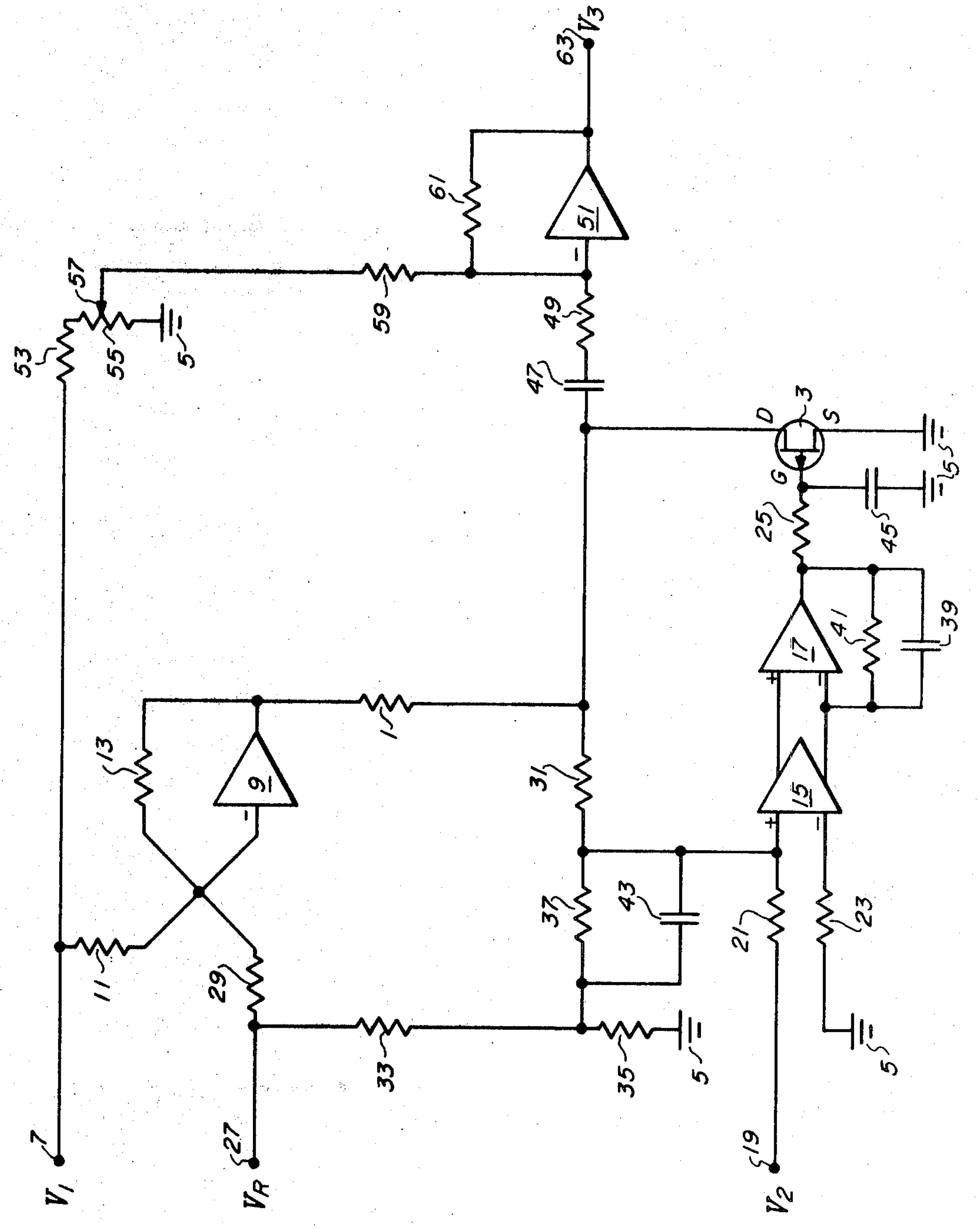
INVENTOR.
LAWSON C. NICHOLS
BY
ATTORNEY

PRECISION MULTIPLIER AND DC TO AC CONVERTER

BACKGROUND OF THE INVENTION

1. Field of the Invention

This invention relates to a multiplier circuit and more particularly to a circuit for multiplying an AC signal by a DC signal using a DC controlled variable resistor.

2. Description of the Prior Art

Heretofore multiplication circuits were of an electromechanical-type using motor driven components or of an electrical-type using photoresistive elements and variable light sources. The mechanical types had certain disadvantages such as low reliability, slow speed of operation, large physical size and high-power requirements. The electrical types using photoresistive elements had certain advantages over the electromechanical types, however, physical construction, slow speed and low reliability remained as major disadvantages.

The field effect transistor while being a voltage controlled variable resistor having the advantages of small size, high speed and good reliability heretofore has not been accepted for use in attenuation-type multiplication circuits because of temperature dependence, nonlinear resistance characteristics, excessive harmonic distortion and unit to unit variations.

SUMMARY OF THE INVENTION

The present invention contemplates an attenuation type multiplication circuit for multiplying an AC signal by a DC signal. A field effect transistor is used as a voltage controlled variable resistor in series with a fixed resistor to form an attenuator having an attenuation factor controlled by a DC input signal. The AC signal is applied to the attenuator which has an AC output signal corresponding to the product of the AC signal and the DC input signal.

The attenuator has a fixed DC reference signal supplied thereto resulting in a DC output signal that is fed back and summed with the DC input signal so that the attenuation factor is independent of temperature, nonlinear resistance characteristics and unit to unit variations of the field effect transistor. The field effect transistor is biased for operation in a constant slope region of the $I_{DS}$ $v$ $V_{DS}$ characteristics of the field effect transistor and the input signals are attenuated so that the multiplication is carried out at a low signal level within the constant slope region. By operating in the constant slope region and at low signal levels harmonic distortion is essentially eliminated. The signal is then amplified and adjusted to a zero reference level.

One object of the invention is to provide a circuit for multiplying an AC signal and a DC signal.

Another object of the invention is to provide a circuit for converting a DC signal to an AC signal.

Another object of the invention is to use a field effect transistor in an attenuation-type multiplication circuit which is free of the effects of temperature, nonlinear resistance, harmonic distortion, and unit to unit variations of the field effect transistor.

Another object of the invention is to provide a reliable, small, high speed multiplication circuit.

Another object of the invention is to provide a DC to AC converter which is relatively free of harmonic distortion and uneffected by frequency variations.

The foregoing and other objects and advantages of the invention will appear more fully hereinafter from a consideration of the detailed description which follows taken together with the accompanying drawing wherein one embodiment of the invention is illustrated by way of example.

DESCRIPTION OF THE DRAWING

In the drawing there is shown a schematic diagram of a multiplier circuit constructed in accordance with the present invention.

DESCRIPTION OF THE INVENTION

Referring to the drawing there is shown a circuit for multiplying an AC signal $V_1$ and a DC signal $V_2$ to obtain an AC signal $V_3$ corresponding to the product. The multiplication is accomplished by applying the AC signal to a variable attenuator having an attenuation factor controlled by the DC signal.

The variable attenuator is formed by a fixed resistor 1 and a field effect transistor 3 connected in series. The field effect transistor has a drain element D connected to resistor 1 and a source element S connected to ground 5. The attenuation factor is determined by the drain to source resistance of the field effect transistor which is controlled by a voltage on a gate element G.

The AC signal $V_1$ is applied to a terminal 7 which is connected to an inverting input of an amplifier 9 through a resistor 11. Amplifier 9 has a feedback resistor 13 connecting its output to the input. The output of amplifier 9 is connected to resistor 1 for supplying an inverted AC signal to the attenuator. Since it is desirable to operate a field effect transistor at low signal levels to reduce harmonic distortion resistor 11 is selected to attenuate signal $V_1$ to a level so that it will not be distorted by transistor 3. Amplifier 9 buffers and inverts the AC signal and presents a low impedance output to the attenuator. The AC signal is attenuated and the attenuated signal appears on the drain element D of transistor 3.

The DC signal $V_2$ is applied to a terminal 19 connected to gate element G through series connected resistor 21, amplifiers 15 and 17 and resistor 25. Resistor 21 connects terminal 19 to a noninverting input of amplifier 15 which also has an inverting input connected to ground 5 by a resistor 23. Resistor 21 attenuates signal $V_2$ to assure operation of transistor 3 within a portion of its characteristics having low distortion. Amplifier 15 is a temperature regulated differential amplifier having a low current and voltage offset and a moderately high gain of approximately 50 to 100 to maintain low drift. Amplifier 15 has two outputs connected to corresponding inputs of a high gain amplifier 17 which has an output connected to gate G of transistor 3 through resistor 25 to supply the gate voltage thereto for controlling the attenuation factor.

The drain to source impedance of a field effect transistor is not solely dependent upon the gate voltage but varies with temperature and unit to unit variations in transistor characteristics. Feedback principles are applied to eliminate these variations and to make the attenuation factor independent of these variations.

A DC reference signal $V_R$ preferably derived from the same source as signal $V_2$ so that a variation in one signal will also be experienced by the other is applied to a terminal 27 connected to the inverting input of amplifier 9 by a resistor 29. The output of amplifier 9 provides an inverted DC reference signal to the attenuator. Resistor 29 is selected to attenuate the reference signal to a level that restricts operation of transistor 3 to a constant slope region of the transistor $I_{DS}$ $v$ $V_{DS}$ characteristics. The inverted DC reference signal is attenuated in accordance with the attenuation factor and is fed back to the noninverting input of amplifier 15 through a resistor 31 connected between the drain element of transistor 3 and the noninverting input of amplifier 15. The attenuated and inverted DC reference signal is of opposite polarity from DC signal $V_2$ and is summed with signal $V_2$ at the noninverting input of amplifier 15. Amplifiers 15 and 17 in response to the sum of the signals adjust the gate voltage on gate element G which in turn controls the attenuation factor making it independent of variations in transistor characteristics.

The effects of transistor nonlinearity can be further reduced by selecting a quiescent operating point within the most linear portion of the transistor characteristics. An initial gate bias voltage is provided by applying a bias signal to the noninverting input of amplifier 15. Signal $V_R$ is attenuated by resistors 33 and 35 connected in series between terminal 27 and ground 5. The signal is further attenuated by a resistor 37 which connects the junction of resistors 33 and 35 to the noninverting input of amplifier 15 and supplies the bias signal thereto. Resistor 33 is selected to adjust the bias signal to the highest level within the linear portion of the transistor characteristics. Selection of the highest possible bias level results in the lowest percent of error caused by zero drift of the DC amplifier 15.

It is desirable to provide only a DC voltage on gate G; therefore, various filters are used to eliminate feedback of the AC signal from drain D. A capacitor 43 is connected in parallel with resistor 37 and attenuates the AC signals to the input of amplifier 15 when the impedance of capacitor 43 is less than resistor 37. A capacitor 39 and a resistor 41 are connected in parallel between the output and inverting input of amplifier 17 and provide negative feedback of AC signals passing through the amplifier and reduce the AC gain of the amplifier at frequencies when the impedance of capacitor 39 is less than resistor 41. A capacitor 45 is connected from gate G to ground 5 and filters out any AC signals that pass through amplifier 17.

The drain element D has both the attenuated AC signal and DC signal appearing thereon. The AC signal has a component caused by an initial drain to source resistance of transistor 3 resulting from the bias voltage applied to gate G. A capacitor 47 and a resistor 49 are connected in series between drain D and an inverting input of an amplifier 51. Capacitor 47 blocks the DC signal on drain D while passing the AC signal to amplifier 51. A series connection of a resistor 53 and a potentiometer 55 is connected between terminal 7 and ground 7. Potentiometer 55 has a wiper 57 connected to the inverting input of amplifier 51 through a resistor 59. Wiper 57 is adjusted to provide a signal having a level equal to the level caused by the initial bias on transistor 3. The wiper signal is summed with the signal passed by capacitor 47 and cancels out the portion of the signal resulting from the initial bias. Thus the signal at the input of amplifier 51 corresponds to the product of signals $v_1$ and $V_2$ but is at a reduced level. A resistor 61 is connected between an output of amplifier 51 and the input and is selected to adjust the gain of amplifier 51 so that the AC signal is amplified to compensate for the initial attenuation of signal $V_1$ by resistor 11. The output of amplifier 51 is connected to an output terminal 63 and supplies a signal $V_3$ thereto that is in phase with signal $V_1$ and exactly corresponds to the product of signals $V_1$ and $V_2$.

The present invention provides a circuit for multiplying an AC signal by a DC signal and obtaining an AC signal corresponding to the product. The nonlinear resistance characteristics of field effect transistors and the effects of temperature and unit to unit variations are eliminated by utilization of feedback principles. Harmonic distortion is reduced by operating at low AC levels within the constant slope region of the $I_{DS}$ v $V_{DS}$ characteristics of the transistor. The circuit provides a small, reliable high speed multiplier and is a DC to AC converter when the variable AC input is maintained at constant level so that the AC output signal corresponds solely to the DC signal and is relatively free of harmonic distortion and is unaffected by frequency variations.

What I claim is:

1. An electronic multiplier circuit for multiplying an AC and DC signal, comprising:

an attenuator including a fixed impedance and voltage controlled resistor connected in series and having an output;

control means connected to the voltage controlled resistor and responsive to the DC signal for controlling the attenuation factor of the attenuator;

means for connecting the AC signal to the attenuator so that the AC signal is attenuated in accordance with the attenuation factor of the attenuator and the attenuator output provides an AC signal corresponding to the product of the AC and DC signals, means for providing a DC reference signal; and means for attenuating the DC reference signal and connecting the signal to the control means so that the voltage controlled resistor is initially biased to an operating point within a linear operating region; and means for cancelling a portion of the AC output signal resulting from the initial bias applied to the voltage controlled resistor.

2. An electronic multiplier circuit for multiplying an AC and DC signal, comprising:

an attenuator including a fixed impedance and a field effect transistor connected in series and having an output;

a DC amplifier having a temperature controlled differential input stage and an output connected to the field effect transistor;

means for applying a fixed DC signal to the DC amplifier so that the field effect transistor is initially biased to a linear operating region;

means connecting the DC signal to the DC amplifier, for controlling the impedance of the field effect transistor and the attenuation factor of the attenuator;

means for applying a fixed DC reference signal to the attenuator so that the attenuator output provides a DC output signal attenuated in accordance with the DC signal;

feedback means connecting the attenuator output to the DC amplifier for providing feedback of the DC output signal thereto and for making the attenuation factor independent of the characteristic of the field effect transistor;

means for connecting the AC signal to the attenuator, so that the attenuator provides an AC output signal attenuated by an amount corresponding to the DC signal and the fixed DC signal;

means connected to the attenuator output for blocking the DC output signal and passing only the AC output signal; and means for cancelling the portion of the AC signal resulting from the fixed DC signal.

3. A circuit as described in claim 2, in which the AC signal is maintained at a constant level and the circuit operates as a DC to AC converter.

4. An electronic multiplier circuit for multiplying an AC and a DC signal, comprising:

an attenuator including a fixed impedance and a voltage controlled resistor connected in series and having an output;

control means connected to the voltage controlled resistor and responsive to the DC signal for controlling the attenuation factor of the attenuator;

means for connecting the AC signal to the attenuator so that the AC signal is attenuated in accordance with the attenuation factor of the attenuator and the attenuator output provides an AC signal corresponding to the product of the AC and DC signals;

means for providing a DC reference signal to the attenuator whereby the attenuator output provides a DC output signal attenuated in accordance with the DC signal;

output means for blocking the DC output signal and for passing only the AC output signal; and feedback means connecting the attenuator output and the control means for providing feedback of the DC output signal to the control means making the attenuation factor substantially independent of the characteristics of the voltage controlled resistor

5. A circuit as described in claim 4, in which the feedback means and the control means include means for filtering the AC output signal from the DC output signal being fed back to the control means.

6. A circuit as described in claim 4, additionally comprising:

means for attenuating the DC reference signal and for connecting the DC reference signal means to the control means so that the voltage controlled resistor is initially biased to an operating point within a linear operating region.

7. A circuit as described in claim 4, additionally comprising:

first attenuation means for attenuating the AC signal to low signal levels to avoid harmonic distortion second attenuation means for attenuating the DC signal to operate the voltage controlled resistor within a portion of its characteristics having low distortion; and amplifier means connected to the attenuator output for amplifying the AC output signal to compensate for attenuation of the AC signal by the first attenuation means.